Aug. 13, 1940. F. G. HODSDON 2,211,012
PULSATOR FOR MILKING MACHINES
Filed Aug. 2, 1937 5 Sheets-Sheet 2
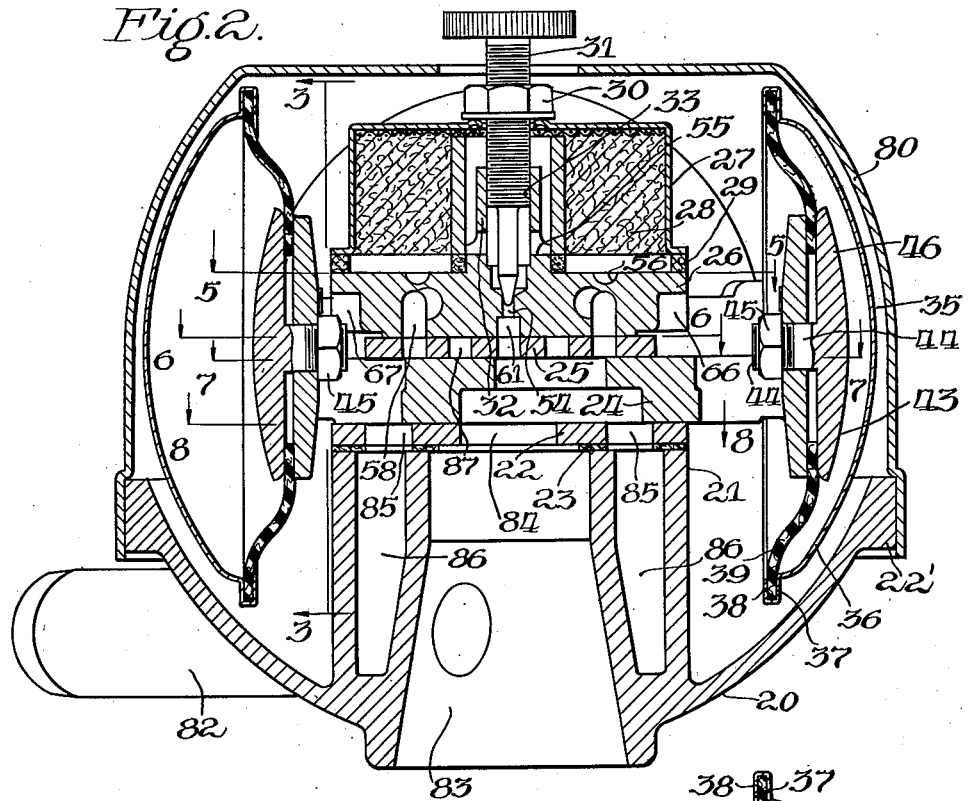
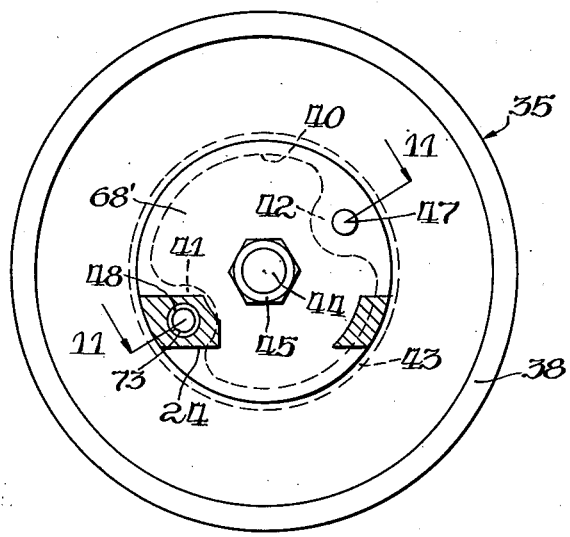
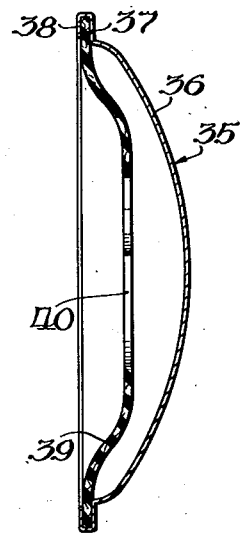
Inventor
Floyd G. Hodsdon
By Atty.

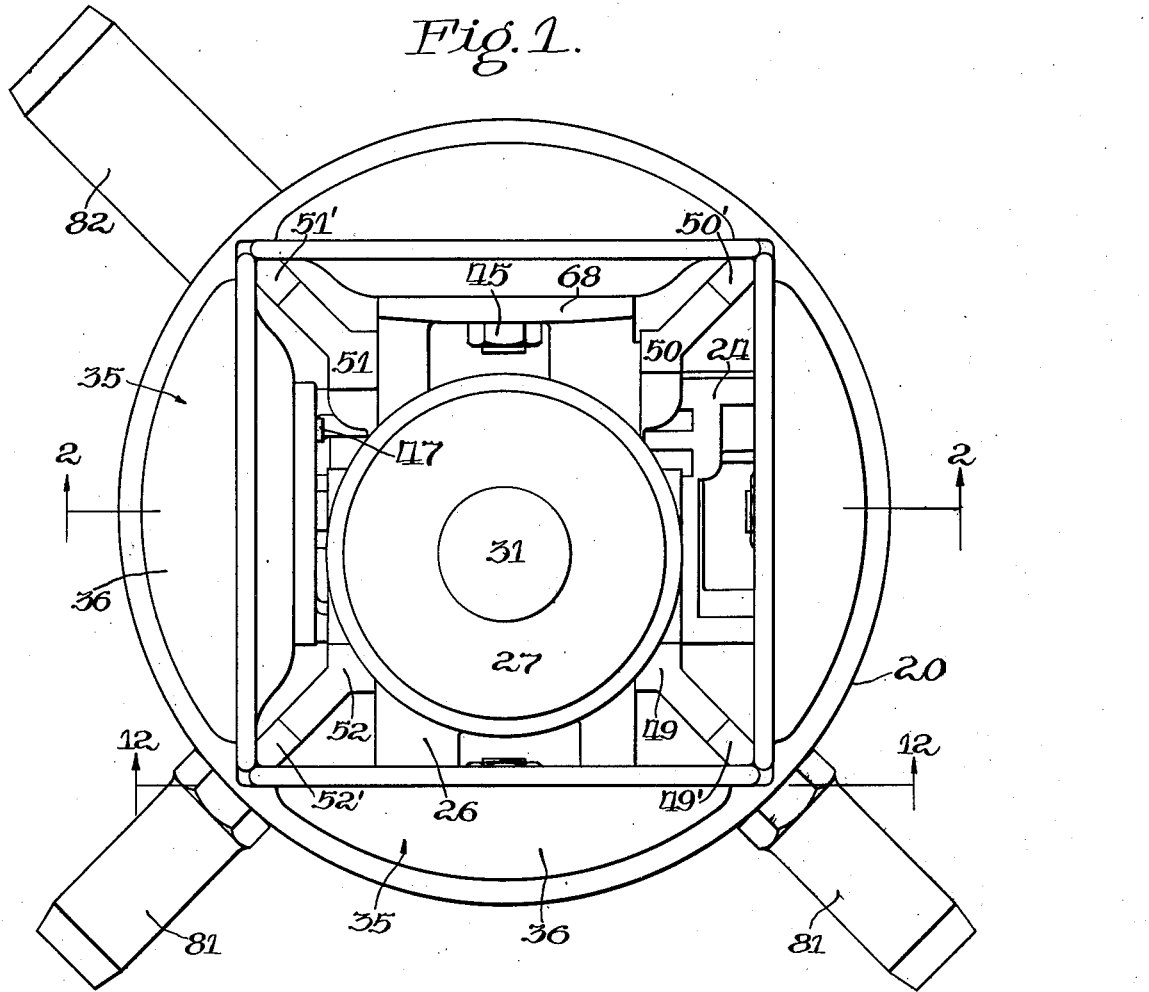

Aug. 13, 1940.     F. G. HODSDON     2,211,012
PULSATOR FOR MILKING MACHINES
Filed Aug. 2, 1937     5 Sheets-Sheet 3

Inventor
Floyd G. Hodsdon.
By V. F. Lassagne
Att'y.

Aug. 13, 1940.   F. G. HODSDON   2,211,012
PULSATOR FOR MILKING MACHINES
Filed Aug. 2, 1937   5 Sheets-Sheet 4

Inventor
Floyd G. Hodsdon.
By *V. F. Lamague*
Att'y.

Aug. 13, 1940.    F. G. HODSDON    2,211,012
PULSATOR FOR MILKING MACHINES
Filed Aug. 2, 1937    5 Sheets-Sheet 5
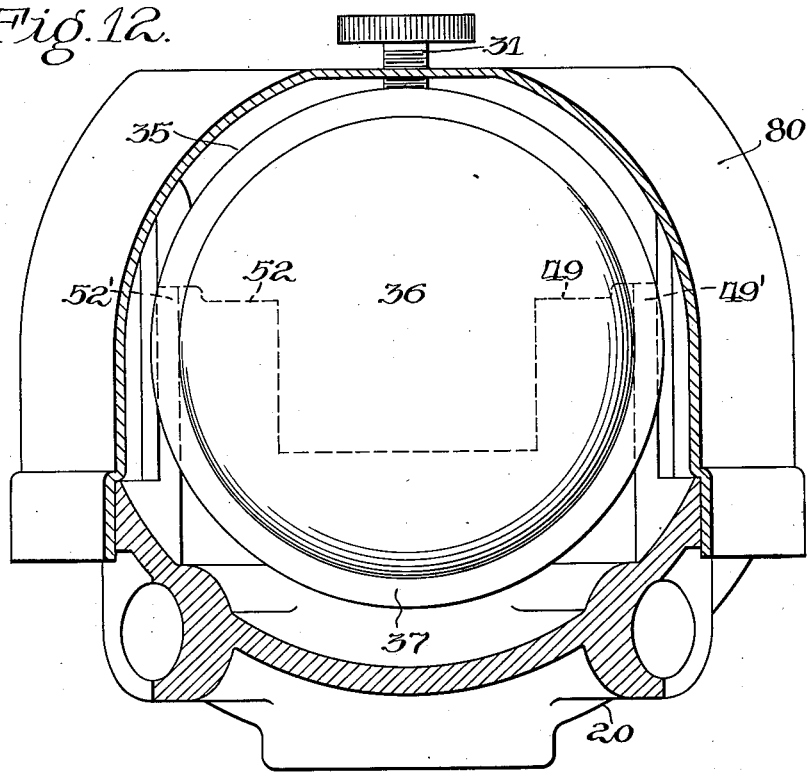
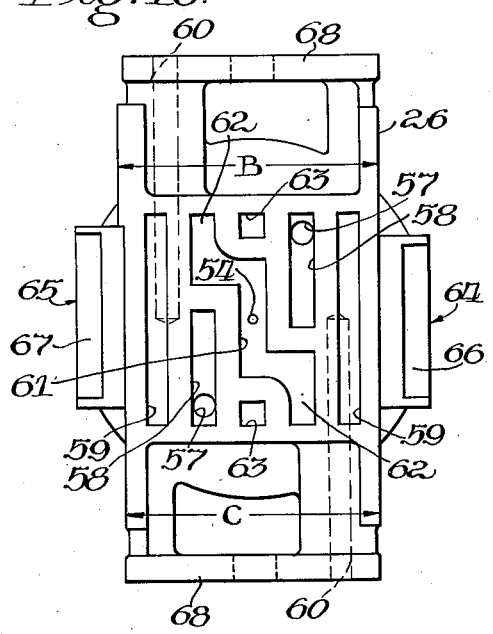
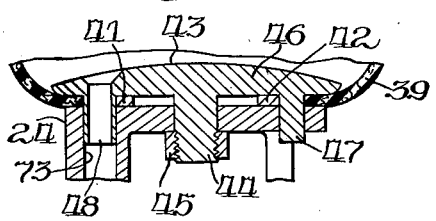
Inventor
Floyd G. Hodsdon
By ................
Att'y.

Patented Aug. 13, 1940

2,211,012

UNITED STATES PATENT OFFICE 2,211,012

PULSATOR FOR MILKING MACHINES

Floyd G. Hodsdon, Milwaukee, Wis., assignor to International Harvester Company, a corporation of New Jersey Application August 2, 1937, Serial No. 156,858

15 Claims. (Cl. 31—61)

This invention relates to pulsators for milking machines of the type shown in applicant's prior Patents 1,844,853 of February 9, 1932, and 2,017,754 of October 15, 1935.

The pulsator of the present application operates generally in the same way as those of the patents, but there are certain changes in the construction of the present pulsator which constitute an improvement over the patents. Applicant's pulsator of the patents and the present application consists of a pulsator body having an upstanding table portion and a plurality of stationary valve plates, and movable slide valves adapted to reciprocate across the table in response to vacuum applied to the pulsator. At each end of the movable slide valves, there is a diaphragm unit to which air and vacuum are applied for effecting reciprocation of the plates. In applicant's prior patents, diaphragms were fastened in the walls of the pulsator body and caps, applied across the diaphragms.

According to this construction, the pulsator body was an integral part of each of the diaphragm units. In reassembling these pulsators, or in replacing them with new diaphragms, difficulty was experienced in placing the proper amount of slack in the diaphragms. Furthermore, in reassembling the pulsators, there was no assurance that the movable slide valves would occupy the same relative positions endwise with respect to the pulsator body, which they had occupied during their original operation. Since the parts tend to wear into one another during continued operation, it was important that the parts be reassembled in the same relation which they originally occupied. Furthermore, the diaphragms were liable to a vertical shrinkage during long continued operation of the pulsator, that would prevent an air-tight fit between the slide valves and valve plates. Since they were fixed to the frame, any vertical shrinkage would lift the slide valves away from the valve plates, or cause them to rub with excessive pressure and cause wear.

The principal object of the invention is to provide a pulsator of improved construction.

Another object is the provision of a pulsator of such construction that, in replacing old diaphragms with new ones, the user does not have the problem of giving the new diaphragms the proper amount of slack.

A further object is to provide a pulsator wherein any distortion of the diaphragms will not prevent the movable valve plates from floating freely.

Another object is the provision of a pulsator wherein the parts may be assembled in only one endwise position with respect to one another.

A further object is to provide a pulsator which is of compact construction and is lighter in weight and of less bulk than the pulsators of applicant's prior patents.

Another object is the provision of a pulsator wherein, after removal of the cover, both control and milker valve plates, and the upper stationary valve plate may be lifted off with the fingers, and the rubbing surfaces are exposed for inspection or cleaning.

A further object is the provision of a pulsator, the speed of which may be observed and regulated without removal of the cover or exposure of the parts.

Other objects of the invention will appear from the disclosure.

According to the present invention, each diaphragm unit attached to the ends of the movable slide valves is separate from the pulsator body. It consists of a shell and a diaphragm clamped within the shell. This diaphragm unit comes as an assembled unit from the factory, where the correct amount of slack is given to the diaphragm by the proper clamping of the shell to the diaphragm. Thus, if a diaphragm is replaced, an entire diaphragm unit is secured and there is no problem of clamping the outside edges. Furthermore, since the diaphragm units are separate from the pulsator body, they are free to move independently of it and allow the movable slide valves to float in response to any irregularities encountered in their travel. Thus, the effect of any distortion of the diaphragms is avoided. Upstanding posts of unequal spacing are provided at the corners of the table across which the valve plates reciprocate. The corners of the stationary and movable valve plates are notched to receive the posts. The spacing of the notches corresponds to that of the posts, so that the plates may be assembled in only one way with respect to the table. The diaphragm units rest against the outer edges of the posts away from the table. Because of this and the fact that the plates receive the posts in notches rather than in openings, a reduction of size along with a reduction of weight of the pulsator is effected.

A spherical cover fits over the valve plates and serves to retain the diaphragm units in place. When the cover is removed, the control and milker valve plates and the upper stationary plate may be lifted off with the fingers, and the rubbing surfaces are exposed for inspection and cleaning.

A control screw attached to the control valve plate extends out through a hole in the cover. Thus, without removal of the cover, the speed of the pulsator may be observed by the movement of the screw which moves with the control valve plate, and the speed may be regulated through adjustment of the screw.

In the drawings,

Figure 1 is a plan view of the pulsator with the cover removed;

Figure 2 is a vertical section through the pulsator, taken along the lines 2—2 of Figure 1;

Figure 3 is a vertical sectional view, taken along the line 3—3 of Figure 2, and shows a diaphragm unit;

Figure 4 is a transverse sectional view taken through a diaphragm unit;

Figure 10 is a detail view showing the under side of the upper slide valve, or control valve plate;

Figure 11 is a sectional view, taken along the line 11—11 of Figure 3, and shows in detail how a diaphragm is clamped to a slide valve; and, Figure 12 is a sectional view, taken along the line 12—12 of Figure 1, and shows how the diaphragm unit rests within the pulsator body.

Figure 6:
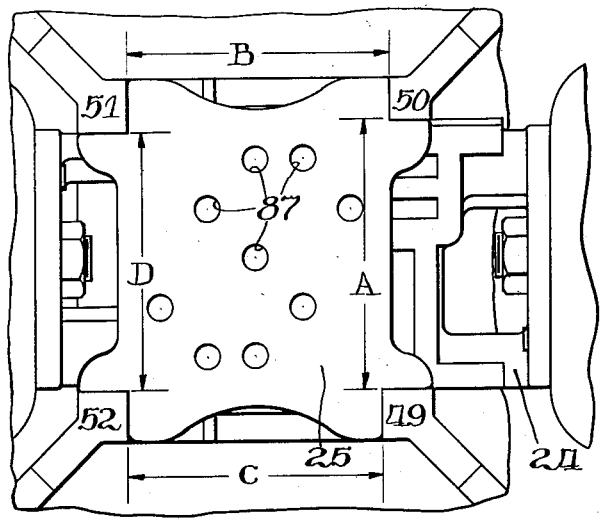
Figure 6 is a sectional view, taken along the line 6—6 of Figure 2, and shows the upper stationary valve plate in position in the pulsator.

In Figures 1 and 2, there is shown a pulsator body 20 having an upstanding table portion 21 and a circular cover receiving flange 22'. A lower stationary valve plate 22 is caused to adhere to the table portion by a piece of rubberized sheeting 23. This sheeting is preferably cement-coated on both sides and covered with Holland cloth until ready for use. When it is to be applied, the Holland cloth is removed. A milker valve plate 24, hereinafter referred to as a lower slide valve, rests on top of the stationary valve plate 22. An upper stationary valve plate 25 rests on the lower slide valve and on top of the plate 25 is a control valve 26, hereinafter referred to as an upper slide valve. A cap member 27, containing an air filter 28, is clamped against a gasket 29 to the upper slide valve 26 by means of a nut 30 on an adjusting screw 31. This screw extends down through the cap and into threaded engagement with an opening 33 in a tubular extension 32 on the upper slide valve 26.

At each end of the upper slide valve 26 and of the valve 24, a diaphragm unit 35 is positioned. This consists of a concavo-convex shell 36, having a flat peripheral portion 37, to which is joined an inturned peripheral flange 38. A diaphragm 39, preferably of rubber fabric, is held within the shell with its edges clamped by the portions 37 and 38 of the shell. The outside diameter of the diaphragm, when free, is larger than the largest internal diameter of the shell. Consequently, when the diaphragm is forced into place within the shell, it bulges outwardly or inwardly, as shown in Figure 4. There is a central opening 40 in the diaphragm, which is circular except for perforated ears 41 and 42 extending within the opening. A clamping member 43 is employed to hold the diaphragm against the end of a valve plate by means of a threaded stem 44 extending through the end and receiving a nut 45. A circular head portion 46 holds the margins of the diaphragm around the central opening against the end of the valve, which is also circular. A solid projection 47 and a tubular projection 48, of different sizes, on the head portion of the clamping member 43, (see Figure 11), extend through openings of corresponding sizes in the perforated ears of the diaphragm and through corresponding openings in the end of the slide valve, and serve to position and hold the diaphragm and slide valve with respect to one another. The head portion 46 is of larger diameter than the opening 40 at the diaphragm, but, since the diaphragm is not taut but bowed inwardly, there is no difficulty in stretching the opening so that the head 46 may pass through it.

As previously described, the edges of the diaphragm are clamped between the peripheral portions 37 and 38 of the shell. The shell and diaphragm may be assembled by the manufacturer with the proper amount of slack in the diaphragm, and supplied to the user as a unit. If a new diaphragm is needed at any time, the user will secure a new unit in place, and he is not faced with the problem of giving the new diaphragm the proper amount of slack as in the case where the diaphragms are secured directly to the pulsator bodies. Such a diaphragm unit is mounted at each end of the upper slide valve 26 and the lower slide valve 24.

Figure 8:
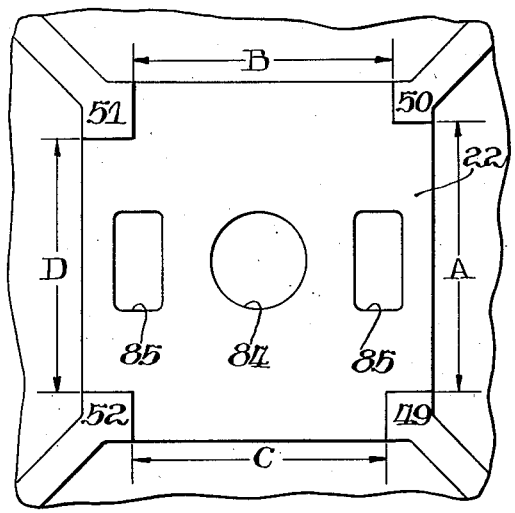
Figure 8 is a sectional view, taken along the line 8—8 of Figure 2, and shows the lower stationary valve plate in position.

Extending upwardly from the corners of the table are four posts 49, 50, 51 and 52. The distances between the adjacent points are designated by A, B, C and D in Figures 6 and 8. The distances C and D are different from one another and from the distances A and B, which may either be the same or different. For the purpose of illustration, the distances of A and B are shown to be the same. A lower stationary valve plate 22 is shown in place in Figure 8. It has notches at its corners of proper spacing to receive the posts. In order that the valve plate may be assembled in only one way with respect to the pulsator body, it is necessary that two adjacent distances between the posts or notches be different from one another and from the two remaining distances, whether these latter distances be the same or different from one another. These conditions are fulfilled in the present case. The adjacent distances C and D are unequal and are different from the distances A and B, which, as illustrated, are the same.

Figure 6 shows the upper stationary valve plate 25. The corners are notched and the distances between the notches correspond to the spacing of the posts in the table portion. This plate also can be assembled in only one way with respect to the table portion, and it will not fit if it is inverted.

Figure 5:
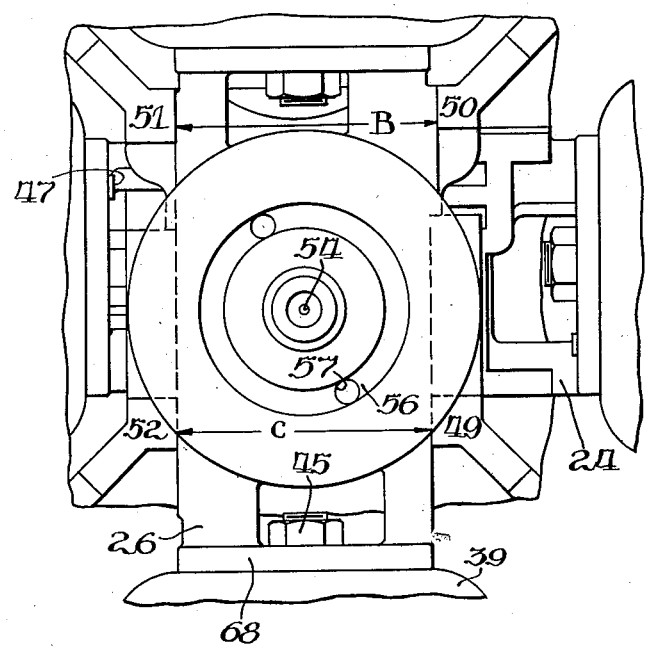
Figure 5 is a view taken on the lines 5—5 of Figure 2, and shows the upper slide valve, or control valve, in position in the pulsator.

The upper slide valve 26 is shown in position on the table portion in Figure 5. This slide valve has a reciprocating motion along its length. It has cut-out portions at its corners or sides of proper size and spacing to receive the posts. Its width at one end is equal to dimension B, so that it may fit between the posts 50 and 51, and at the other end is equal to dimension C, so as to fit between the posts 49 and 52, in order that its endwise position cannot be reversed. Lengthwise of the upper slide valve, the dimensions between the notches must be less than the spacing of the posts 49 and 50, and 51 and 52; that is, the dimensions A and D, by an amount at least equal to the reciprocation of the upper slide valve.

Figure 7:
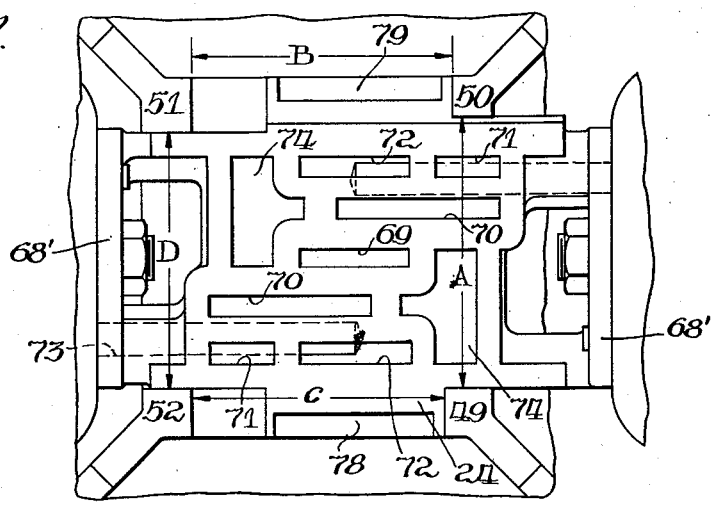
Figure 7 is a sectional view, taken along the line 7—7 of Figure 2, and shows the lower slide valve, or milker valve plate, in position in the pulsator.

As seen in Figure 7, the lower slide valve 24 is adapted to reciprocate in a direction at right angles to the line of reciprocation of the upper slide valve 26. Consequently, the spacing of the notches in its corner or side must, at one end across its width, be equal to the dimension A, and at the other end, equal to the dimension D. Lengthwise of the plate, the spacings will be less than B and D, respectively, by an amount at least equal to the reciprocation of the slide valve.

By the above described spacing of the posts and the dimensioning of the stationary plates and movable slide valves, it is possible to assemble them into the pulsator body in only one position with respect to one another.

The upper slide valve 26 has a central upstanding, tubular portion 32 threaded to receive the adjusting screw 31 in an opening 33. A transverse bore 55 extends through the tubular portion. In the upper surface of the slide valve is a circular groove 56 and, connecting this circular groove with straight grooves 58 in the lower side of the plate, are through openings 57. (See Figures 5 and 10.) On the under side there are also straight grooves 59 which connect with the tubular projections 48 on the head portion of the clamping members by bores 60. Thus, communication is provided between the grooves 59 and the diaphragm units. Centrally of the upper slide valve is a groove 61, into which the central tubular opening 54 extends. This groove has offset ends 62. In line with the main part of this groove are depressions 63. This slide valve also has side portions 64 and 65, which strike against the posts and so limit the length of the reciprocating movement. These side portions are recessed at 66 and 67, as shown in Figures 2 and 10, so as to allow room for the nuts 45 which hold the diaphragm units to the lower slide valve 24. As shown in Figure 3, ends 68' of the lower slide valve 24 are circular, so that they constitute a proper backing against which to hold the diaphragms. The ends 68 of the upper slide valve 26 are also circular for the same reason.

Figure 9:
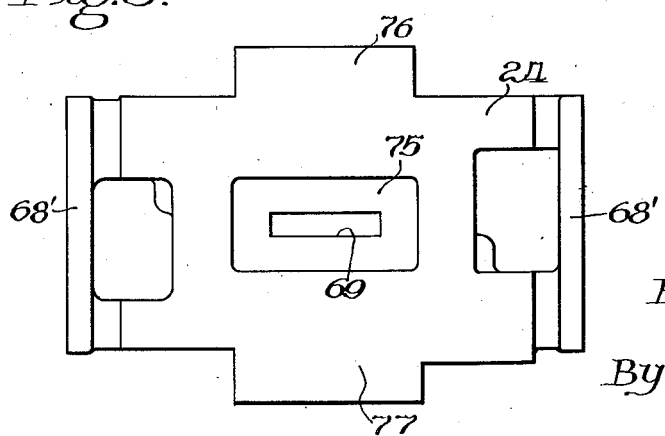
Figure 9 is a detail view showing the under side of the lower slide valve, or milker valve plate.

As viewed in Figures 7 and 9, the lower slide valve 24 has a longitudinal groove 69 extending through the slide valve. From the top surface of the slide valve are also grooves 70, as well as grooves 72, which connect with the tubular projections 48 on the clamping members 44 through bores 73. Thus, communication is obtained between the grooves 72 and the diaphragm units mounted on the ends of the lower slide valve. There are also depressions 71 and 74 in the top of the lower slide valve, and on the under side is an extensive depression 75 (see Figure 9), into which the groove 69 extends. Side portions 76 and 77 serve as stops and strike against the posts and so limit the reciprocating movement, as previously referred to on the upper slide valve. There are depressions 78 and 79 which accommodate the nuts 45 which hold the diaphragm units to the upper slide valve.

During the operation of the pulsator, the upper slide valve 26 and the lower slide valve 24 reciprocate because the diaphragm units exert a pulling force, and, therefore, they must be held against movement in the directions of reciprocation. As shown in Figures 1 and 12, the diaphragm units are held between the rearwardly extending portions 49', 50', 51', and 52' of the posts and the flange 22, and pull against the said portions of the posts. A spherical cover 80 fits over the pulsator against the flange 22 of the pulsator body and aids in retaining the diaphragm units in position. Thus, it will be seen that movement of the diaphragm units along the lines of reciprocation of the plates is prevented, but may take place at right angles to these movements in a shifting motion along portions 49', 50', 51' and 52' of the posts. Consequently, a so-called floating of the slide valves will take place and, if there is any distortion of the diaphragms, it will not prevent free floating of the slide valves during their reciprocation. Thus, any shrinkage or stretching of the diaphragms or any possible wear between the sliding surfaces will not prevent an air-tight fit between the dry, unlubricated slide valves and the valve plates.

Since the diaphragm units rest against the rear edges of the posts and the stationary valve plates and slide valves receive the posts in notches, rather than in slots or perforations, an overall reduction in size and weight is effected. Thus, the pulsator of the present application is lighter and more compact than that of applicant's prior patents.

Attached to the pulsator body are nipples 81 to be connected to the teat clusters, and a larger nipple 82 to be attached to a source of vacuum. The nipple 82 is in communication with a central opening 83.

The lower stationary valve plate has a central circular opening 84 in line with the opening 83 in the pulsator body. There are also two separate spaced, rectangular openings 85 providing access to chambers 86 in the pulsator body, each of which is in communication with one of the nipples 81. When only one cow is to be milked at a time, one of the nipples is replaced by a screw plug.

The upper stationary valve plate has a plurality of circular openings 87 and is notched at its side, so as to provide a space for the nuts 45, which hold the diaphragm units to the upper and lower slide valves.

The operation of the pulsator will be described very briefly, since it is the same as that of the pulsator of applicant's patents previously referred to. In operation, a tapered plug provided on the milk receiver cover is inserted within the opening 83 in the pulsator body. Vacuum is applied to the nipple 82, and, because of the arrangement of the ports and passages in the plate, vacuum is applied to one diaphragm unit and air, to the other diaphragm unit attached to the upper slide valve. The valve tends to move in the direction of the diaphragm unit to which the vacuum is applied. When it reaches the end of its stroke, the air and vacuum are reversed on the lower slide valve, and the latter moves quickly to one end. Because of the movement of the lower slide valve, the air and vacuum on the upper slide valve are reversed, and it moves back to its original position. Then follows a consequent reversal of air and vacuum on the lower slide valve and a reversal of position. This results in movement of the upper slide valve. Thus, there is a continuous operation with the upper slide valve moving back and forth and the lower slide valve effecting a quick change of position at the end of each stroke of the upper slide valve, and a resultant intermittent application of air and vacuum to the teat cup clusters. A slowing down of the upper slide valve is controlled by throttling the flow of vacuum at the point of needle towards the diaphragm units at each end. No matter how slow the upper slide valve moves, it will cause instantaneous movements of the lower slide valve.

From the detailed description of the grooves and depressions in the upper and lower slide valves, it will be noted that there are depressions 71 and 74 in the upper surface of the lower slide valve and depressions 63 in the lower surface of the upper slide valve, which are not present in the plates of applicant's patents. Also, the grooves 59 in the upper slide valve are approximately twice the length of the corresponding grooves of applicant's patents. With this arrangement of grooves and depressions, uniform grill-like surfaces are provided, which may be lapped more readily than the surfaces of the plates of applicant's patents, wherein there are large areas with no grooves.

From the foregoing description it will be seen that applicant has provided a pulsator of improved construction, in which the problem of providing the diaphragms wtih the proper amount of slack is no longer present, wherein the upper and lower slide valves may float, and wherein the parts are capable of assembly in only one way with respect to one another.

Applicant intends to limit his invention only within the scope of the appended claims.

What is claimed is:

1. The combination with a slide valve adapted to reciprocate in a pulsator, of a pair of diaphragm units respectively secured to the ends of the valve plate, each diaphragm unit comprising a substantially circular shell of concavo-convex form with a flat peripheral portion and an inwardly extending flange thereon on the concave side, and a diaphragm clamped between the peripheral portion and the flange and having a substantially circular hole in the center and having its peripheral edge pressed against the shell so that the diaphragm assumes a bowed shape, the diaphragm unit being secured to the plate through portions of the diaphragm immediately surrounding the central opening.

2. The combination with a slide valve adapted to reciprocate in a pulsator, of a pair of diaphragm units respectively secured to the ends of the valve plate, each diaphragm unit consisting of a substantially circular shell of concavo-convex form having a flange at its periphery extending toward the center of the shell and a substantially circular diaphragm clamped at its periphery between the shell and the flange and having a central opening and having its peripheral edge pressed against the portion at the shell connecting the flange and the remainder of the shell so that the diaphragm is bowed, and a pair of clamp members, each clamp member having a head portion holding the portions of the diaphragm immediately around the central opening against an end of the slide valve and a stem portion extending through the central opening in engagement with the end of the plate.

3. The combination with a slide valve adapted to reciprocate in a pulsator, of a pair of diaphragm units respectively positioned at the ends of the valve plate, each unit comprising a shell having a peripheral flange and a diaphragm held at its edge portions within the flange and secured at its center portion to an end of the valve plate, the shell pressing against the peripheral edge of the diaphragm so that the diaphragm assumes a bowed shape.

4. The combination with a slide valve adapted to reciprocate in a pulsator and having bores extending inwardly from the ends, of a pair of diaphragm units, one positioned at each end of the slide valve and comprising a concavo-convex shell with an inturned peripheral flange and a diaphragm held within the flange of the shell and having a central opening substantially circular except for perforated ears within the opening, and a pair of clamping members, each comprising a substantially circular head portion with a plurality of spaced locating lugs, one of which has a bore extending therethrough and a stem portion, the head portion being within the diaphragm unit and pressing the diaphragm against the end of the slide valve by cooperation of the stem portion with the slide valve, the locating lugs passing through the perforations in the ears in the diaphragms for engagement with the end of the plate, the lug having the through bore being in the bore in the end of the slide valve whereby communication is afforded between the interior of the diaphragm unit and the bore in the valve.

5. In a milking machine pulsator, a pulsator body having a substantially square table portion and a plurality of posts extending from the corners of the table portion, a slide valve adapted to reciprocate across the table portion, and a plurality of diaphragm units, one at each end of the valve and comprising a concavo-convex shell with an inwardly extending peripheral flange and a diaphragm held within the flange and secured at its center to an end of the slide valve, the shell at each end being positioned against a pair of said posts away from the table so that as the valve plate reciprocates the diaphragms flex and the shells are held against movement in the direction of reciprocation but may move at right angles thereto so as to allow a floating of the slide valve.

6. In a milking machine pulsator, a pulsator body having a table portion and a plurality of posts positioned about the table portion, a slide valve adapted to move across the table portion, and a pair of diaphragm units, one being secured at each end of the slide valve and resting against a pair of said posts but capable of movement along the pair of posts whereby upon reciprocation of the slide valve the diaphragm units are held against movement in the line of reciprocation and the ability of the diaphragm units to move along the posts permits a floating of the slide valves.

7. In a milking machine pulsator, a pulsator body having an upstanding table portion and a plurality of posts extending from said table portion at the corners of an imaginary quadrilateral, a slide valve adapted to reciprocate across the table portion and having cut-out portions at its sides receiving the posts, and a pair of diaphragm units, one secured at each end of the slide valve and resting against a pair of said posts whereby upon reciprocation of the valve plate the diaphragm units are held against movement in the line of reciprocation but may move along the posts and so permit a floating of the valve plate.

8. In a milking machine pulsator comprising a pulsator body having a table portion, the combination of a plurality of spaced posts extending from the table portion at the corners of an imaginary quadrilateral of which two adjacent sides are of different length from one another and from the other two sides, and a slide valve adapted to reciprocate across the table portion with cut-out portions at the corners receiving the posts, the cut-out portions being so spaced that the distances between adjacent cut-out portions in a direction at right angles to the line of reciprocation of the valve plate correspond respectively to the spacings between the posts and the distances between the cut-out portions along the line of reciprocation correspond respectively to the spacings between the posts minus the distance of reciprocation.

9. In a milking machine pulsator comprising a pulsator body having an upstanding table portion, the combination of a plurality of posts extending from the table portion at the corners of an imaginary quadrilateral of substantially square shape of which two adjacent sides are of equal length and different from the remaining two sides which are different from one another, and a slide valve adapted to reciprocate across the table portion with cut-out portions at the corners receiving the posts of such size and relative spacing that the slide valve can be assembled in only one position with respect to the table portion with a particularly cut-out portion receiving only a particular post.

10. In a milking machine pulsator comprising a pulsator body having a table portion, the combination of a plurality of spaced posts extending from the table portion and a slide valve adapted to reciprocate across the table portion and having cut-out portions at its sides receiving the posts, the sizes and spacings of the posts and cut-out portions being such that the slide valve can be assembled in only one endwise position with respect to the table portion with a particular cut-out portion receiving only a particular post.

11. A milking machine pulsator comprising a pulsator body having a table portion, a plurality of posts extending from the corners of the table portion and a flange spaced outwardly from the table portion, a spherical cover resting on the flange and enclosing the table portion, a slide valve adapted to reciprocate across the table portion, and a pair of diaphragm units attached to the ends of the valve and held against movement in the line of reciprocation of the valve plate between the posts, the flange and the spherical cover but being allowed a slight movement along the posts whereby floating of the valve plate may take place.

12. A milking machine pulsator comprising a pulsator body having a table and a flange spaced outwardly from the table portion and extending about it, a plurality of slide valves adapted to reciprocate across the table portion, diaphragm units attached to the ends of the valve plates, and a cup-shaped cap resting with its edges on the flange and enclosing the slide valves and diaphragm units.

13. In a milking machine pulsator, a pulsator body having a table portion, a slide valve adapted to move across the table portion, and a pair of diaphragm units each composed of a member and a diaphragm secured to one another, secured at the ends of the slide valve and held by the body against movement in the line of reciprocation of the slide valve but capable of movement in other directions so as to allow a floating of the stationary valve plate and the movable slide valves.

14. A milking machine pulsator comprising a pulsator body having a table portion, a plurality of slide valves adapted to reciprocate across the table portion, a cap enclosing the slide valves and having a central opening, and a member extending from one of the slide valves through the opening, whereby the speed of the said slide valve may be observed without removal of the cap.

15. A milking machine pulsator comprising a pulsator body having a table portion and a flange extending about the table portion, a pair of slide valves adapted to reciprocate across the table portion along lines at right angles with respect to one another, a cup-shaped cap with a central opening having its edges in contact with the flange and enclosing the slide valves, and a member secured to one of the slide valves and extending through the central opening in the cap, whereby the speed of operation of the pulsator may be observed and regulated without removal of the cap.

FLOYD G. HODSDON.